(12) United States Patent
Kang et al.

(10) Patent No.: US 9,195,271 B2
(45) Date of Patent: Nov. 24, 2015

(54) TOUCH PANEL, METHOD OF MANUFACTURING THE SAME, AND DISPLAY APPARATUS

(71) Applicant: Samsung Display Co., Ltd., Yongin, Gyeonggi-Do (KR)

(72) Inventors: Sung-Ku Kang, Yongin (KR); Mi-Ae Park, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 63 days.

(21) Appl. No.: 13/928,175

(22) Filed: Jun. 26, 2013

(65) Prior Publication Data
US 2014/0118634 A1 May 1, 2014

(30) Foreign Application Priority Data
Oct. 26, 2012 (KR) ........................ 10-2012-0119793

(51) Int. Cl.
| | |
|---|---|
| G06F 3/041 | (2006.01) |
| G06F 1/16 | (2006.01) |
| G06F 3/044 | (2006.01) |
| B82Y 30/00 | (2011.01) |

(52) U.S. Cl.
CPC .............. *G06F 1/1643* (2013.01); *G06F 3/044* (2013.01); *G06F 3/0412* (2013.01); *B82Y 30/00* (2013.01); *Y10T 29/49105* (2015.01)

(58) Field of Classification Search
CPC .................... G06F 3/044; G06F 3/047; G09G 2203/04111; G09G 2203/04112
USPC .................................. 345/173, 174; 178/18.06
See application file for complete search history.

(56) References Cited

U.S. PATENT DOCUMENTS

| | | | |
|---|---|---|---|
| 6,677,542 B2 | 1/2004 | Katakami | |
| 8,780,061 B2* | 7/2014 | Jung et al. | 345/173 |
| 2008/0309623 A1* | 12/2008 | Hotelling et al. | 345/173 |
| 2011/0141055 A1* | 6/2011 | Hsu | 345/174 |
| 2011/0147192 A1* | 6/2011 | Hsu | 200/600 |
| 2011/0174190 A1 | 7/2011 | Sepa et al. | |
| 2011/0308929 A1 | 12/2011 | Kim et al. | |
| 2013/0069887 A1* | 3/2013 | Lee et al. | 345/173 |

FOREIGN PATENT DOCUMENTS

| | | |
|---|---|---|
| KR | 10-0540547 B1 | 12/2005 |
| KR | 10-2011-0095526 A | 8/2011 |
| KR | 10-2011-0105537 A | 9/2011 |
| KR | 10-2011-0138545 A | 12/2011 |

* cited by examiner

*Primary Examiner* — Stephen Sherman
(74) *Attorney, Agent, or Firm* — Knobbe Martens Olson & Bear LLP

(57) ABSTRACT

In one aspect, a touch panel comprising a substrate and a first conductive patterned portion that is formed on the substrate is provided. The first conductive patterned portion may include: a first direction conductive portion that is formed on the substrate, the first direction conductive portion including a plurality of first body members, a first intermediate member formed between the first body members, and a first connection member which is electrically connected to the first body members; and a second direction conductive portion that is formed on the substrate and is insulated from the first direction conductive portion, the first intermediate member including a plurality of second body members and a second connection member which is electrically connected to the second body members.

18 Claims, 11 Drawing Sheets

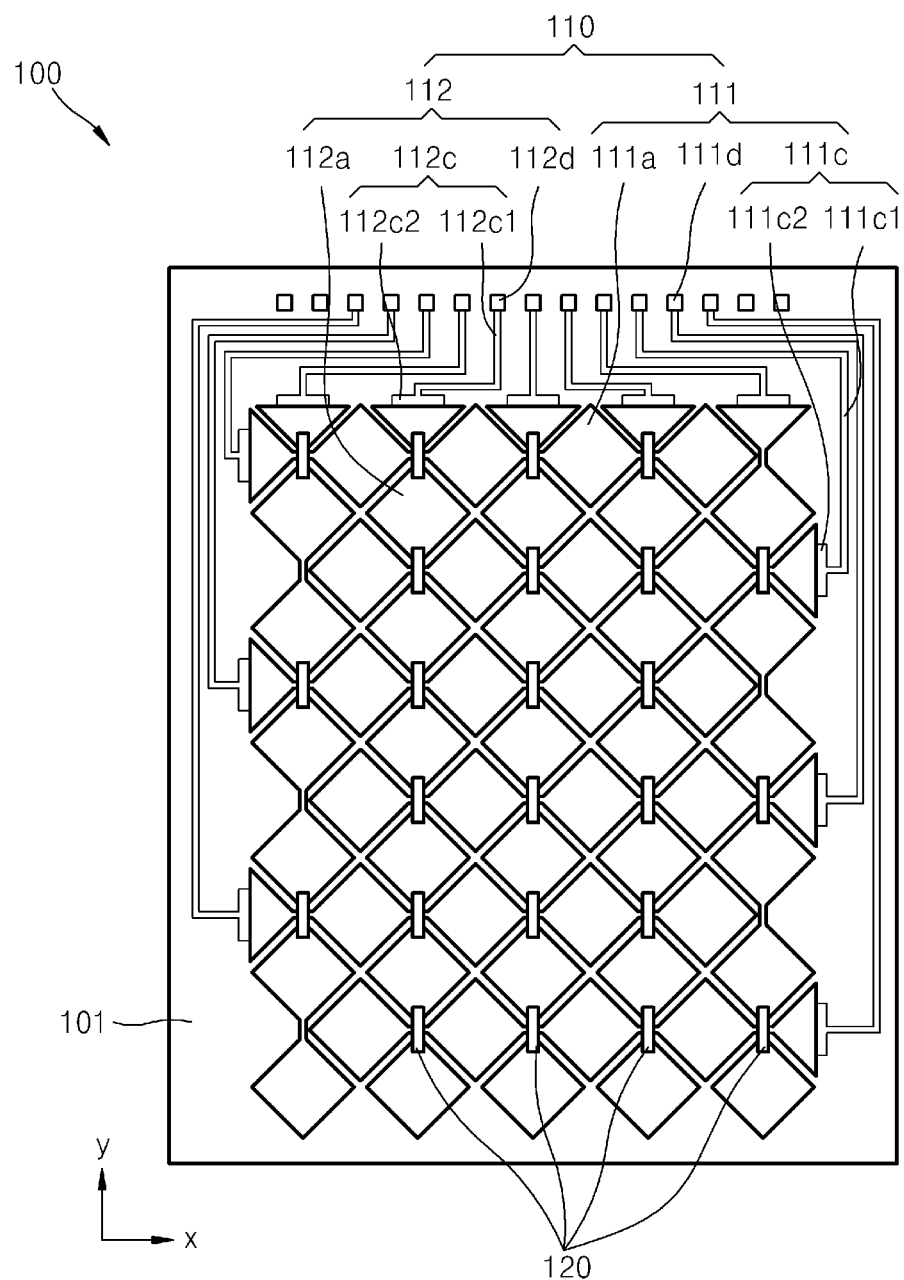

TOUCH PANEL, METHOD OF MANUFACTURING THE SAME, AND DISPLAY APPARATUS

CROSS-REFERENCE TO RELATED APPLICATION

This application claims priority to and the benefit of Korean Patent Application No. 10-2012-0119793, filed on Oct. 26, 2012 in the Korean Intellectual Property Office, the disclosure of which is incorporated herein by reference in its entirety.

BACKGROUND

1. Field

The described technology generally relates to a touch panel, a method of manufacturing the touch panel, and a display apparatus including the touch panel, and more particularly, to a touch panel with improved electrical characteristics, a method of manufacturing the touch panel, and a display apparatus including the touch panel.

2. Description of the Related Technology

Touch panels have recently been used in various fields because the touch panels may perform as an input device by being touched by a user's finger or a pen without using other means, such as a keyboard.

In particular, display apparatuses have recently been replaced with portable thin flat plate type display apparatuses. Also, methods of applying a touch panel function to the flat plate type display apparatuses is under development.

A touch panel may include a plurality of conductive elements, in general, conductive elements that are arranged in one direction and additional conductive elements that are arranged in a direction intersecting the direction in which the conductive elements are arranged.

In addition, users control a position of a touch panel requiring high precision. Consequently, patterns included in a touch panel have become smaller and more complicated than that of a conventional touch panel. Thus, efficiency has reduced for processes of manufacturing a touch panel, and defects may occur during the process, and accordingly, there are a limitations in improving electrical characteristics of the touch panel.

SUMMARY

The present invention provides a touch panel with improved electrical characteristics, a method of manufacturing the touch panel, and a display apparatus including the touch panel.

According to an aspect of the present embodiments, there is provided a touch panel including a substrate and a first conductive patterned portion that is formed on the substrate, wherein the first conductive patterned portion includes: a first direction conductive portion that is formed on the substrate, the first direction conductive portion including a plurality of first body members, a first intermediate member formed between the first body members, and a first connection member which is electrically connected to the first body members; and a second direction conductive portion that is formed on the substrate and is insulated from the first direction conductive portion, the second direction conductive portion including a plurality of second body members and a second connection member which is electrically connected to the second body members, wherein at least one of the first body member and the second body member includes a plurality of nanowires containing silver (Ag) and an overcoating layer covering the nanowires, and is formed to cover at least one area of the first connection member or the second connection member. In some embodiments, the plurality of nanowires are formed to partially contact a top surface and a side surface of the first connection member or the second connection member. In some embodiments, the first connection member and the second connection member include a metal material. In some embodiments, the first connection member includes a first connecting element, which contacts the first body members, and a first extension member, which extends to be connected to the first connecting element and has a width smaller than that of the first connecting element. In some embodiments, the first body members are formed to partially cover a top surface of the first connecting element. In some embodiments, the first body members are formed to contact a top surface and a side surface of the first connecting element. In some embodiments, the second connection member includes a second connecting element, which contacts the second body members, and a second extension member, which extends to be connected to the second connecting element and has a width smaller than that of the second connecting element. In some embodiments, the second body members are formed to partially cover of a top surface of the second connecting element. In some embodiments, the second body members are formed to contact a top surface and a side surface of the second connecting element. In some embodiments, the touch panel further includes a first pad member, which contacts one end of the first connection member, and a second pad member that contacts one end of the second connection member. In some embodiments, the touch panel further includes a second conductive patterned portion that is arranged to electrically connect the second body members, which are located adjacent to each other and spaced apart from each other. In some embodiments, the touch panel further includes an insulating layer that is arranged to cover at least the second body members, the first body members, and the first intermediate member, the insulating layer including contact holes corresponding to top surfaces of the second body members, wherein the second conductive patterned portion contacts the second body members that are located adjacent to each other via the contact holes and spaced apart from each other. In some embodiments, the touch panel further includes an insulating layer that covers a predetermined area of the first intermediate member, where the insulating layer is formed below the second conductive patterned portion, and the insulating layer is patterned to insulate the first intermediate member and the second conductive patterned portion from each other. In some embodiments, the first direction conductive portion and the second direction conductive portion are located on the same surface of the substrate. In some embodiments, the first direction conductive portion and the second direction conductive portion are located on different surfaces of the substrate.

According to another aspect of the present embodiments, there is provided a method of manufacturing a touch panel including a substrate and a first conductive patterned portion which is located on the substrate, the method including: forming the first conductive patterned portion, wherein the forming of the first conductive patterned portion includes: forming a first direction conductive portion that is formed on the substrate, the first direction conductive portion including a plurality of first body members, a first intermediate member formed between the first body members, and a first connection member which is electrically connected to the first body members; and forming a second direction conductive portion that is formed on the substrate and is insulated from the first direction conductive portion, the second direction conductive portion including a plurality of second body members and a second connection member which is electrically connected to the second body members, wherein at least one of the first body member and the second body member includes a plurality of nanowires containing silver (Ag) and an overcoating layer covering the nanowires, and is formed to cover at least one area of the first connection member or the second connection member. In some embodiments, the method further includes forming the first body members to cover at least one area of the first connecting element after forming the first connecting element. In some embodiments, the method further includes forming the second body members to cover at least one area of the second connecting element after forming the second connecting element. In some embodiments, forming at least one of the first body member and the second body member, which include the plurality of nanowires containing Ag and the overcoating layer covering the nanowires, includes: forming a liquid material containing the nanowires and a solvent on the substrate; forming a nanowire layer by drying and hardening the liquid material; forming the overcoating layer on the nanowire layer; and patterning the nanowire layer and the overcoating layer. In some embodiments, the first body member and first intermediate member are formed as one body. In some embodiments, the first body member, the first intermediate member, and the second body member are formed of the same material at the same time.

According to another aspect of the present embodiments, there is provided a display apparatus including: a touch panel; and a display panel located at one side of the touch panel, wherein the touch panel includes a substrate and a first conductive patterned portion that is formed on the substrate, wherein the first conductive patterned portion includes: a first direction conductive portion that is formed on the substrate, wherein the first direction conductive portion includes a plurality of first body members, a first intermediate member formed between the first body members, and a first connection member which is electrically connected to the first body members; and a second direction conductive portion that is formed on the substrate and is insulated from the first direction conductive portion, wherein the second direction conductive portion includes a plurality of second body members and a second connection member which is electrically connected to the second body members, wherein at least one of the first body member and the second body member includes a plurality of nanowires containing silver (Ag) and an overcoating layer covering the nanowires, and is formed to cover at least one area of the first connection member or the second connection member. In some embodiments, the display panel includes an organic light-emitting device panel or a liquid crystal panel.

BRIEF DESCRIPTION OF THE DRAWINGS

The above and other features and advantages of the present embodiments will become more apparent by describing in detail exemplary embodiments thereof with reference to the attached drawings in which:

FIGS. 4A through 4F are views for sequentially describing a method of manufacturing the touch panel of FIG. 1;

DETAILED DESCRIPTION

Exemplary embodiments according to the present embodiments will be described in detail with reference to the accompanying drawings. It is to be understood, the described embodiments may be modified in various different ways, all without departing from the spirit or scope of the present disclosure. Expressions such as "at least one of," when preceding a list of elements, modify the entire list of elements and do not modify the individual elements of the list.

Figure 1:
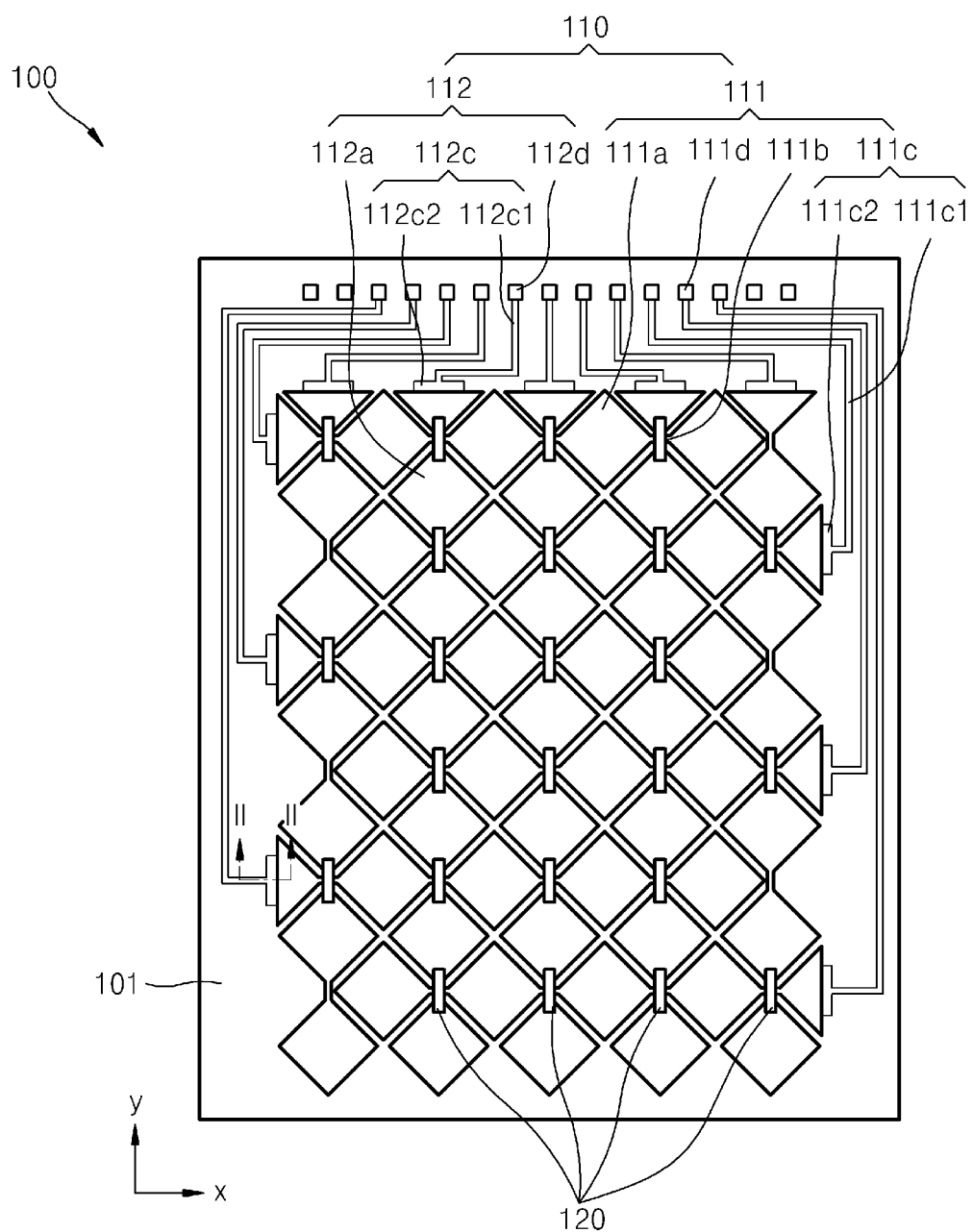
FIG. 1 is a schematic plan view of a touch panel according to an embodiment.
Figure 2:
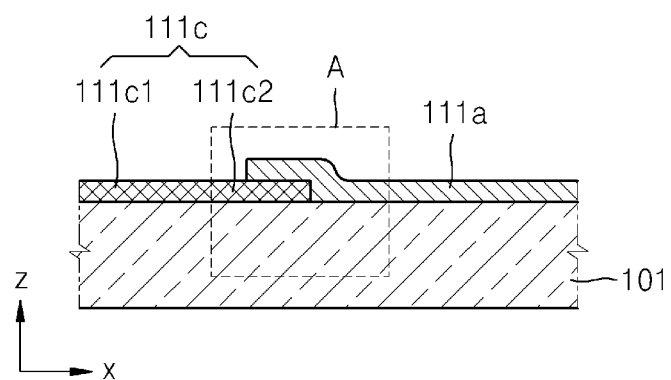
FIG. 2 is a cross-sectional view taken along line II-II of FIG. 1.
Figure 3:
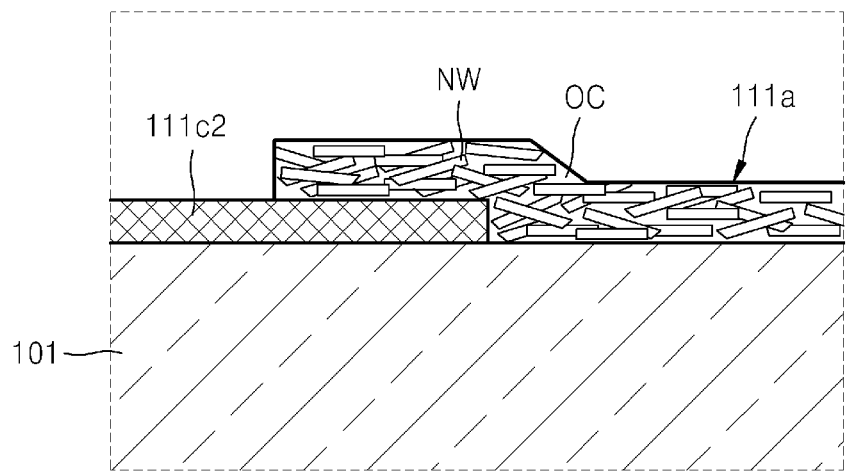
FIG. 3 is an enlarged view of part 'A' shown in FIG. 2.

FIG. 1 is a schematic plan view of a touch panel 100 according to an embodiment of the present invention. FIG. 2 is a cross-sectional view taken along line II-II of FIG. 1. FIG. 3 is an enlarged view of part 'A' shown in FIG. 2.

Referring to FIGS. 1 through 3, the touch panel 100 includes a substrate 101, a plurality of first conductive patterned portions 110, and a plurality of second conductive patterned portions 120. Each of the first conductive patterned portions 110 includes a first direction conductive portion 111 and a second direction conductive portion 112.

The first direction conductive portion 111 includes a first body member 111a, a first intermediate member 111b, a first connection member 111c, and a first pad member 111d. A plurality of the first body members 111a are arranged in one direction (an x-axis direction of FIG. 1), and the first intermediate member 111b having a smaller size than the first body member 111a is formed between the first body members 111a adjacent to each other. In some embodiments, the first body member 111a and the first intermediate member 111b may be formed of the same material as one body. The first connection member 111c includes a first extension member 111c1 and a first connecting element 111c2. One end of the first extension member 111c1 is connected to the first pad member 111d, and the first connecting element 111c2 is connected to the first body member 111a. In some embodiments, the first connecting element 111c2 is formed to have a width greater than that of the first extension member 111c1 to improve a contact characteristic between the first connecting element 111c2 and the first body member 111a.

The second direction conductive portion 112 includes a second body member 112a, a second connection member 112c, and a second pad member 112d. A plurality of the second body members 112a are arranged in one direction (a y-axis direction of FIG. 1). The second body members 112a adjacent to each other are spaced apart from each other, and the second body members 112a that are adjacent to each other are electrically connected to each other by the second conductive patterned portion 120. The second connection member 112c includes a second extension member 112c1 and a second connecting element 112c2. One end of the second extension member 112c1 is connected to the second pad member 112d, and the second connecting element 112c2 is connected to the second body member 112a. In some embodiments, the second connecting element 112c2 is formed to have a width greater than that of the second extension member 112c1 to improve a contact characteristic between the second connecting element 112c2 and the second body member 112a.

FIGS. 2 and 3 show the first connection member 111c and the first body member 111a in detail.

The first connection member 111c is formed on the substrate 101, and the first body member 111a is formed on the first connection member 111c. In some embodiments, the first body member 111a is formed to contact a top surface and a side surface of the first connecting element 111c2.

In some embodiments, the first extension member 111c1 and the first connecting element 111c2 of the first connection member 111c may be formed of a metal material.

In some embodiments, the first body member 111a may include a plurality of nanowires NW and an overcoating layer OC. In some embodiments, the nanowires NW may be formed of a metal material, for example, silver (Ag). In some embodiments, the nanowires NW may contact the first connecting element 111c2. In some embodiments, the overcoating layer OC may be formed to cover the nanowires NW and thus may effectively protect the nanowires NW. In some embodiments, the overcoating layer OC allows the nanowires NW not to separate from the substrate 101 and the first body member 111a. In some embodiments, since the first body member 111a includes the plurality of nanowires NW, the flexibility of the touch panel 100 is improved compared to when the first body member 111a is formed as a single type conductor.

In some embodiments, since the first intermediate member 111b and the first body member 111a may be formed of the same material as one body, the first intermediate member 111b may include the nanowires NW and the overcoating layer OC. In some embodiments, the second body member 112a of the second direction conductive portion 112 may be formed of the same material as the first body member 111a, and the second connection member 112c may be formed of the same material as the first connection member 111c.

Hereinafter, a method of manufacturing components of the touch panel 100 shown in FIG. 1 will be described in detail with reference to FIGS. 4A through 4F.

FIGS. 4A through 4F are views for sequentially describing a method of manufacturing a touch panel, such as the touch panel 100 of FIG. 1.

Figure 4A:
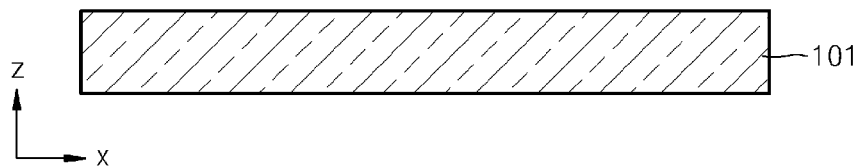

Referring to FIG. 4A, first, the substrate 101 is prepared. In some embodiments, the substrate 101 may be formed of any of various materials. In some embodiments, the touch panel 100 may be formed to be freely deformable according to a user's intention by preparing the substrate 101 formed of a flexible material, for example, a plastic material. However, the present embodiments are not limited thereto, and the substrate 101 may be formed of a stack of an organic material and an inorganic material, or may be formed of a glass material.

Figure 4B:
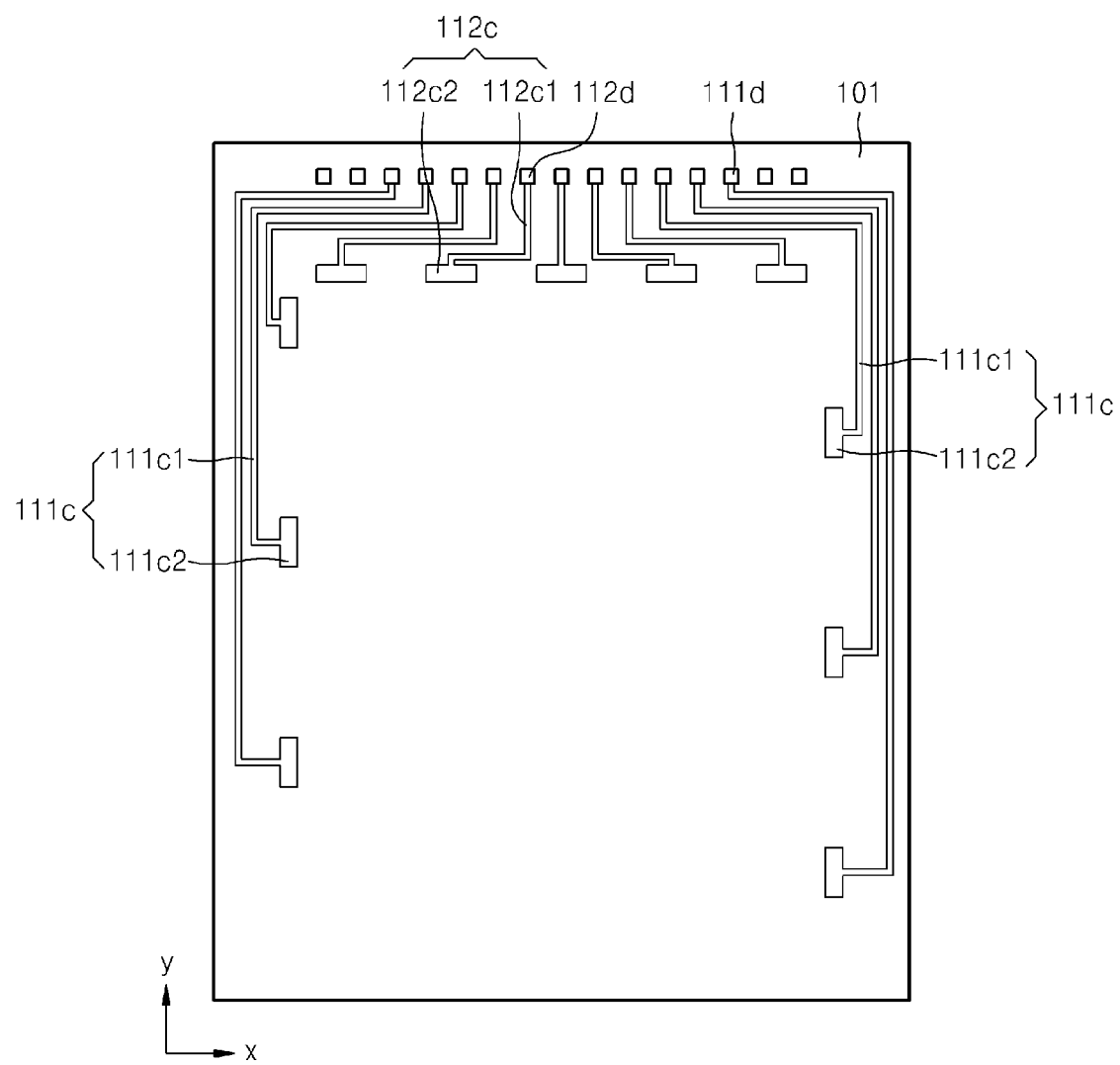

Then, referring to FIG. 4B, the first connection members 111c, the second connection members 112c, the first pad members 111d, and the second pad members 112d may be formed on the substrate 101.

In some embodiments, the first pad members 111d and the second pad members 112d are located to be adjacent to an edge of the substrate 101. In some embodiments, the first pad members 111d and the second pad members 112d are electrically connected to a circuit unit (not shown) for controlling or driving the touch panel 100.

The first connection member 111c includes the first extension member 111c1 and the first connecting element 111c2. In some embodiments, the first extension member 111c1 extends in a y-axis direction shown in FIG. 4B to be connected to the first pad member 111d located on the substrate 101. In some embodiments, the first connecting element 111c2 is connected to one end of the first extension member 111c1. In some embodiments, the first connecting element 111c2 is formed to have a width greater than that of the first extension member 111c1 and to have a plate shape. Although FIG. 4B shows the first connecting element 111c2 having a shape similar to a rectangular shape, the present embodiments are not limited thereto, and the first connecting element 111c2 may be formed to have other shapes.

In some embodiments, the first extension member 111c1 and the first connecting element 111c2 may include a metal material having an excellent electrical conductivity, and may be formed as one body.

The second connection member 112c includes the second extension member 112c1 and the second connecting element 112c2. In some embodiments, the second extension member 112c1 extends in the y-axis direction shown in FIG. 4B to be connected to the second pad member 112d. In some embodiments, the second connecting element 112c2 is connected to one end of the second extension member 112c1. In some embodiments, the second connecting element 112c2 is formed to have a width greater than that of the second extension member 112c1 and to have a plate shape. Although FIG. 4B shows the second connecting element 112c2 having a shape similar to a rectangular shape, the present embodiments are not limited thereto, and the second connecting element 112c2 may be formed to have other shapes.

In some embodiments, the second extension member 112c1 and the second connecting element 112c2 may include a metal material having an excellent electrical conductivity, and may be formed as one body.

Figure 4C:
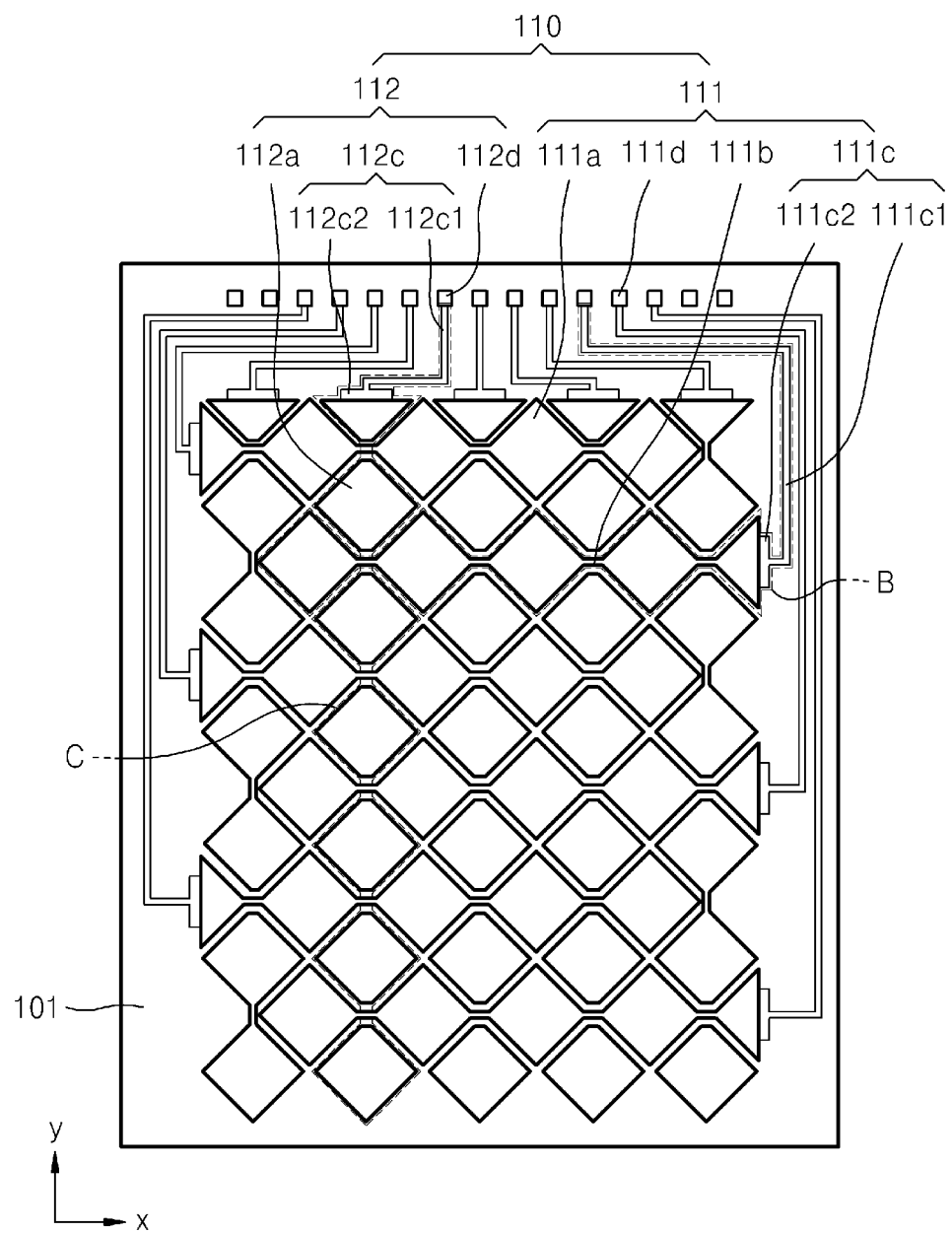

Then, referring to FIG. 4C, the first direction conductive portion 111 is completed by forming the first body member 111a and the first intermediate member 111b, and the second direction conductive portion 112 is completed by forming the second body member 112a, thereby completing the first conductive patterned portion 110.

In some embodiments, the plurality of first body members 111a, which are connected to the first connecting element 111c2 and may be arranged in a first direction (an x-axis direction of FIG. 4C), and the first intermediate members 111b, each which is located between the first body members 111a adjacent to each other, are formed.

In some embodiments, the plurality of second body members 112a, which are connected to the second connecting element 112c2 and are arranged in a direction (a y-axis direction of FIG. 4C) substantially perpendicular to the first direction, are formed. In some embodiments, the second body members 112a are spaced apart from each other not to be electrically connected to each other. Among the second body members 112a located at leftmost and rightmost as shown in FIG. 4C, two second body members 112a that are adjacent to each other may be partially connected to each other.

In some embodiments, referring to a dashed line 'B' of FIG. 4C showing one first direction conductive portion, the first body members 111a may be formed to have an approximately diamond shape, and the first body members 111a may be formed in series in the first direction, for example, in an x-axis direction shown in FIG. 4A. In some embodiments, the first intermediate member 111b is formed between the first body members 111a that are adjacent to each other to connect the first body members 111a.

In some embodiments, the first body member 111a and the first intermediate member 111b may be formed as one body, and include the nanowires NW and the overcoating layer OC. In some embodiments, the nanowires NW include a metal material, for example, Ag.

Hereinafter, an example of a method of manufacturing the first body members 111a and the first intermediate members 111b will be described in detail.

In some embodiments, the substrate 101 may be coated with a liquid material including the nanowires NW, which are formed of Ag, and a solvent. In some embodiments, the liquid material including the nanowires NW and the solvent may be formed to cover the first connecting elements 111c2.

Then, the liquid material may be dried and hardened to form a nanowire layer including Ag, and the overcoating layer OC including an insulating material is coated on the nanowire layer. Next, the first body member 111a and the first intermediate member 111b that include the nanowires NW and the overcoating layer OC may be formed as one body via a patterning process. During the patterning process, the first body member 111a may cover at least one area of the first connecting element 111c2.

Referring to a dashed line 'C' of FIG. 4C showing one second direction conductive portion 112, the plurality of second body members 112a may be formed to have an approximately diamond shape, and the second body members 112a are arranged in a second direction, for example, the y-axis direction of FIG. 4C.

In some embodiments, the second body members 112a may not be connected to each other. In some embodiments, the second body members 112a may be connected to each other by the second conductive patterned portions 120 to be described below.

In some embodiments, the second body member 112a may include the same material as the first body member 111a, that is, the nanowires NW and the overcoating layer OC. In some embodiments, the nanowire NW includes a metal material, for example, Ag.

In some embodiments, for convenience, the second body members 112a may be formed at the same time when the first body members 111a and the first intermediate members 111b are formed. In some embodiments, the first body members 111a, the first intermediate members 111b, and the second body members 112a may be formed by using only one patterning process.

Figure 4E:
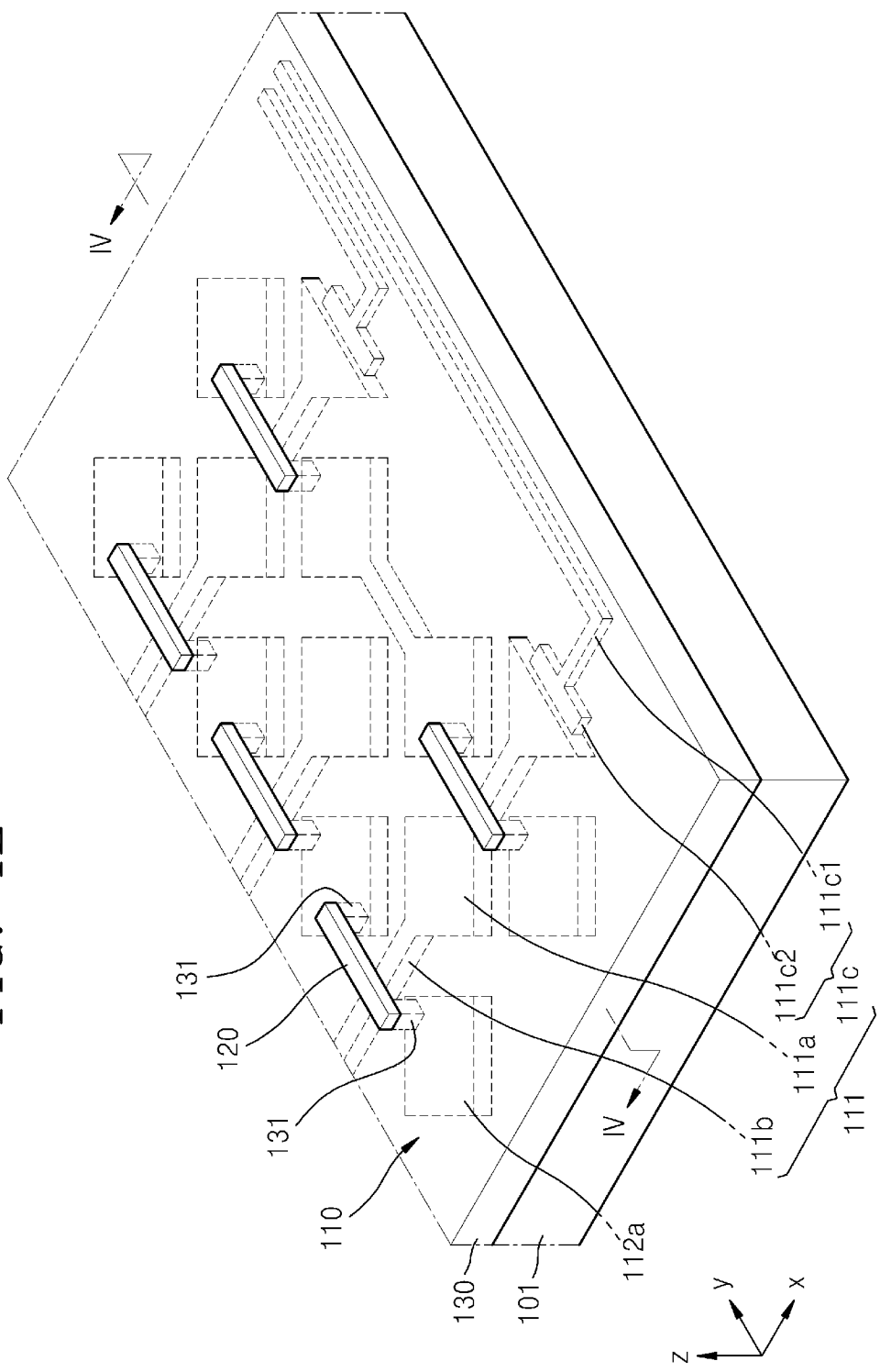
Figure 4F:
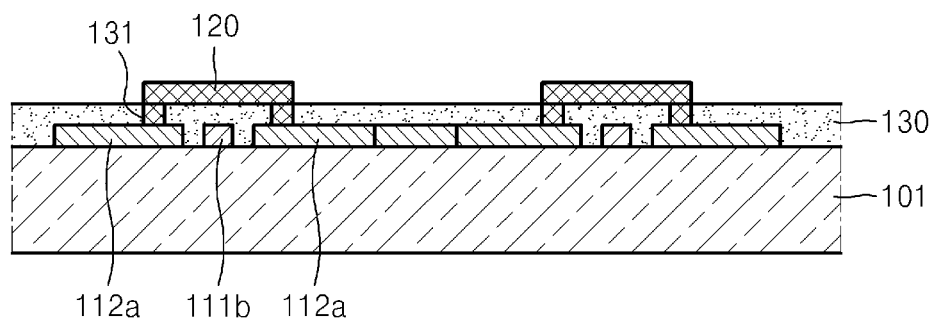

Then, referring to FIGS. 4D through 4F, the touch panel 100 may be completed by forming an insulating layer 130 and the second conductive patterned portions 120.

FIG. 4E is a perspective view for describing the second conductive patterned portions 120 shown in FIG. 4D in detail. FIG. 4F is a cross-sectional view taken along line IV-IV shown in FIG. 4E.

In some embodiments, the insulating layer 130 may be formed on at least the first body members 111a, the first intermediate members 111b, and the second body members 112a. In some embodiments, the insulating layer 130 has a plurality of predetermined contact holes 131 that correspond to predetermined areas of top surfaces of the second body members 112a that are adjacent to each other. In some embodiments, the contact holes 131 may be formed to correspond to top surfaces of edges, which face each other, of the second body members 112a that are adjacent to each other.

In some embodiments, the second conductive patterned portions 120 may be formed to fill the contact holes 131, and thus the second conductive patterned portions 120 may electrically connect the second body members 112a that are adjacent to each other.

Accordingly, the first body members 111a and the first intermediate members 111b, which are formed in directions intersecting the second direction conductive portions 112, do not contact the second direction conductive portions 112. In some embodiments, the second conductive patterned portions 120 may prevent the first direction conductive portions 111 and the second direction conductive portions 112 from being electrically connected to each other.

In some embodiments, the second conductive patterned portion 120 may be formed of a conductive material, for example, the same material as the first body member 111a. In some embodiments, the second conductive patterned portion 120 may be formed of a transparent material, such as indium tin oxide (ITO), indium zinc oxide (IZO), zinc oxide (ZnO), aluminum zinc oxide (AZO), or $In_2O_3$, or may be formed of a metal material.

Also, the second conductive patterned portions 120 are disposed to fill the contact holes 131 after the insulating layer 130 that has the contact holes 131 is formed, the present embodiments are not limited thereto.

In some embodiments, the insulating layer 130 may be patterned to cover predetermined areas of the first intermediate members 111b instead of being entirely formed on the first body members 111a, the first intermediate members 111b, and the second body members 112a. In some embodiments, the insulating layer 130 is located below an area, in which the second conductive patterned portions 120 are to be formed, to cover predetermined areas of the first intermediate members 111b, and thus the insulating layer 130 may be formed in a minimum area for insulating the second conductive patterned portions 120 and the first intermediate members 111b from each other. Accordingly, in such embodiments, the patterned insulating layer 130 may not have the contact holes 131.

In some embodiments, a protection layer (not shown) may be formed to cover the second conductive patterned portions 120.

In some embodiments, the touch panel 100 may be a capacitance-type touch panel. For example, if a user touches the touch panel 100, a capacitance of a part where a touch has occurred varies, and thus the touch panel 100 senses user's input.

In some embodiments of the touch panel 100, the plurality of first body members 111a may be arranged in one direction and may be connected to the first intermediate members 111b. In some embodiments, the second body members 112a, which are adjacent to each other, are electrically connected to each other by forming the second conductive patterned portions 120 after the second body members 112a are disposed in a direction intersecting with a direction in which the plurality of first body members 111a are located.

Accordingly, when a user touches the touch panel 100, the touch panel 100 may easily sense a part where the touch has occurred.

In some embodiments of the touch panel 100, the first body members 111a, including the nanowires NW, which include Ag, and the overcoating layer OC, may be formed on the first connecting elements 111c2 formed of a metal material. In some embodiments, the plurality of nanowires NW may be located on the first connecting elements 111c2 to directly contact the first connecting element 111c2 and the overcoating layer OC may be located to cover the nanowires NW so as to decrease contact resistance between the first connecting element 111c2 and the first body member 111a and to effectively prevent the nanowires NW from being separated, and thus the durability of the first body members 111a may be improved to thereby improve electrical characteristics of the touch panel 100.

Also, in some embodiments the touch panel 100 includes substrate 101 formed of a flexible material, and thus the touch panel 100 may be easily deformed according to a user's intention. When the first body member 111a includes the nanowires NW, the flexibility of the first body member 111a may be increased, and accordingly, the flexibility of the touch panel 100 may be increased compared to when the first body member 111a is formed of other conductive materials.

In some embodiments, the first body member 111a may be formed integrally with the first intermediate member 111b, and thus a process convenience may be improved.

In some embodiments, the second body member 112a may be formed of the same material as the first body member 111a, and thus electrical characteristics of the touch panel 100 may be improved.

Figure 5:
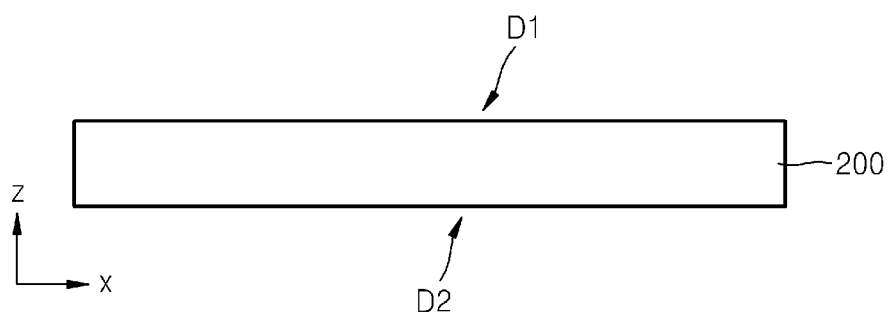
FIG. 5 is a side view of a touch panel according to another embodiment.
Figure 6:
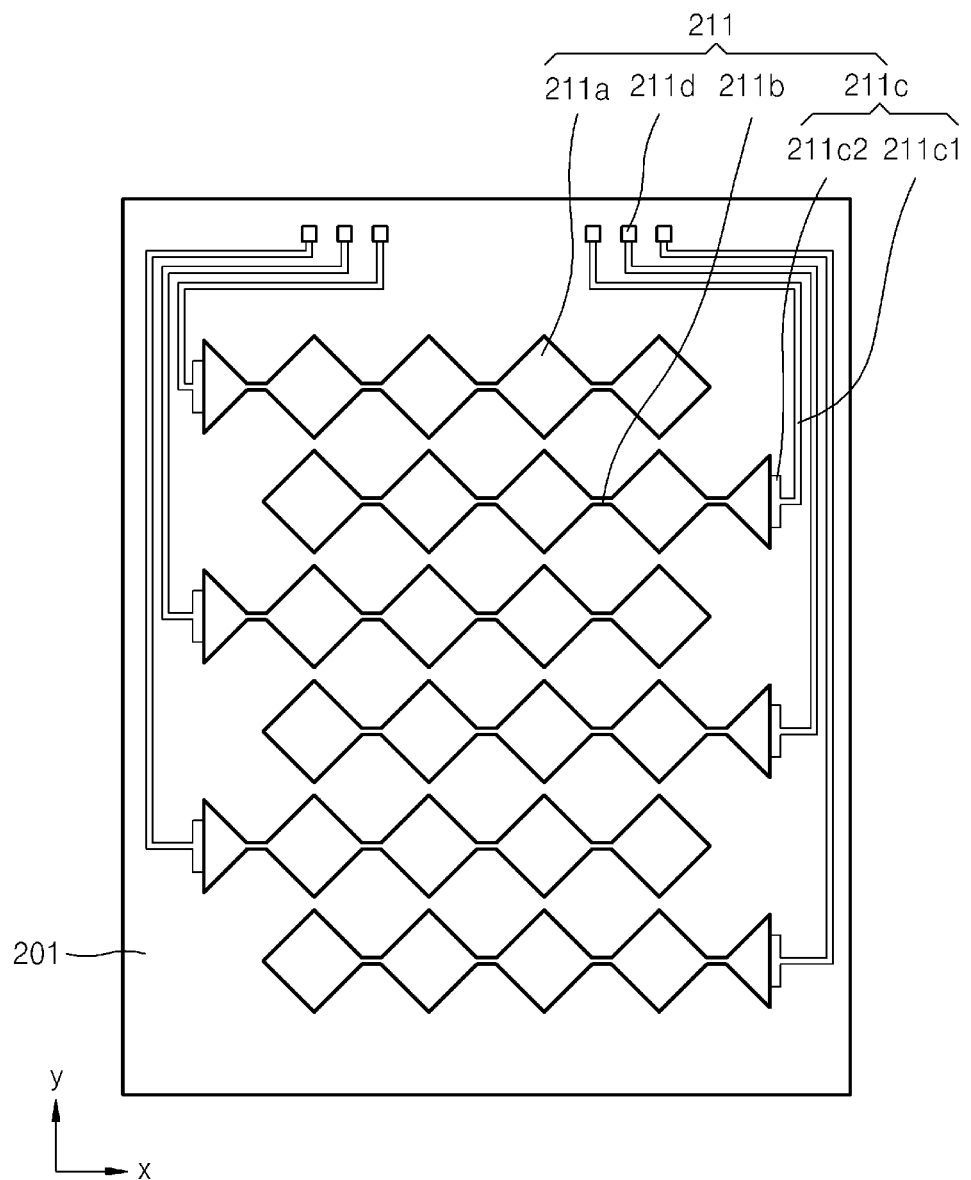
FIG. 6 is a plan view seen from a direction D1 of FIG. 5.
Figure 7:
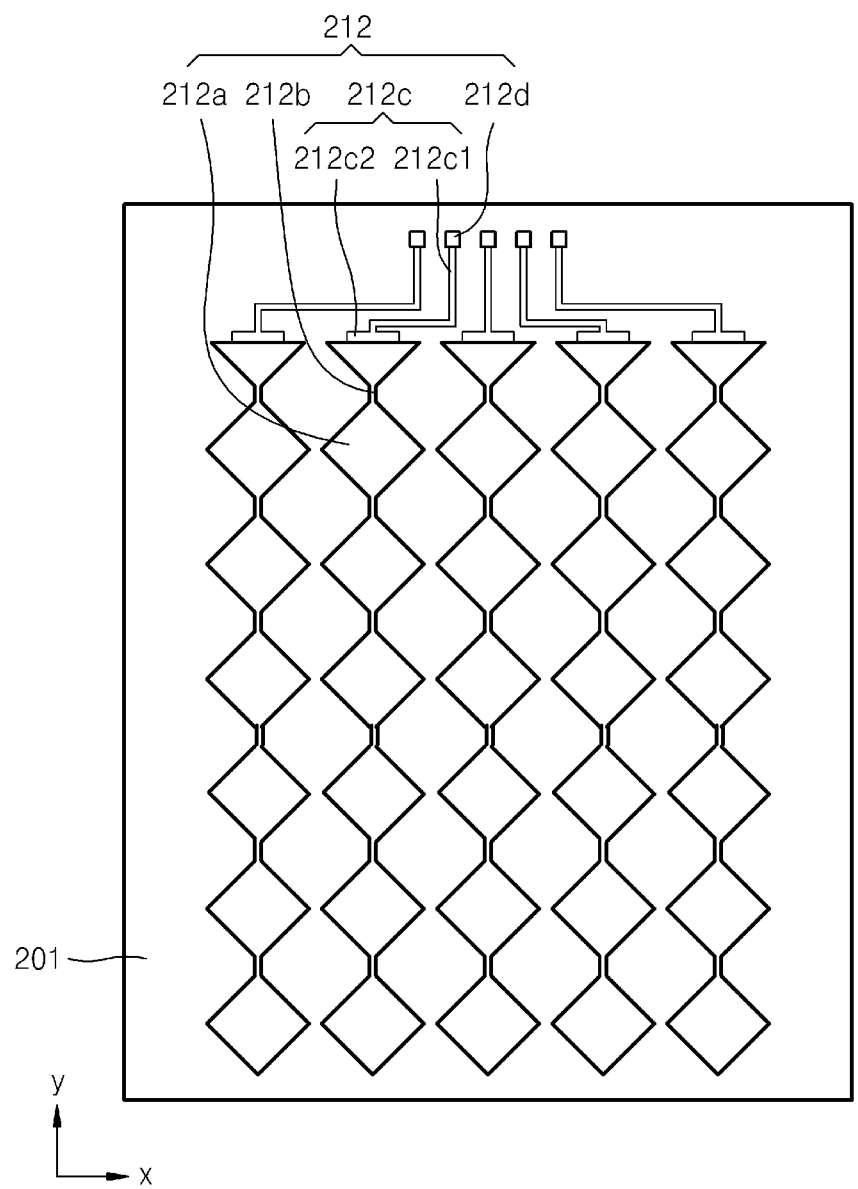
FIG. 7 is a plan view seen from a direction D2 of FIG. 5.

FIG. 5 is a side view of a touch panel 200 according to another embodiment. FIG. 6 is a plan view seen from a direction D1 of FIG. 5. FIG. 7 is a plan view seen from a direction D2 of FIG. 5. For convenience of description, only certain aspects of the present embodiments will be described below.

Referring to FIG. 6, a plurality of first direction conductive portions 211 may be formed on a surface of a substrate 201. Each of the first direction conductive portions 211 may include a first body member 211a, a first intermediate member 211b, a first connection member 211c, and a first pad member 211d. In some embodiments, a plurality of the first body members 211a may be arranged in one direction, that is, in an x-axis direction shown in FIG. 6.

Referring to FIG. 7, a plurality of second direction conductive portions 212 may be formed on a surface of the substrate 201, which is opposite to the surface on which the first direction conductive portions 211 are formed. Each of the second direction conductive portions 212 may include a second body member 212a, a second intermediate member 212b, a second connection member 212c, and a second pad member 212d. In some embodiments, the second body members 212a may be arranged in one direction (a y-axis direction of FIG. 7). In some embodiments, the second direction conductive portion 212 may include the second intermediate member 212b. For example, the second body members 212a adjacent to each other may be connected to each other via the second intermediate member 212b.

In some embodiments, since the first direction conductive portions 211 and the second direction conductive portions 212 are located on different surfaces, the first body members 211a and the second body members 212a do not fundamentally contact each other. Accordingly, there is no need to form a contact hole and a second conductive patterned portion of an insulating layer for connecting the second body members 212a.

In some embodiments, a protection layer (not shown) may be formed on the first direction conductive portions 211 and the second direction conductive portions 212.

Figure 8:
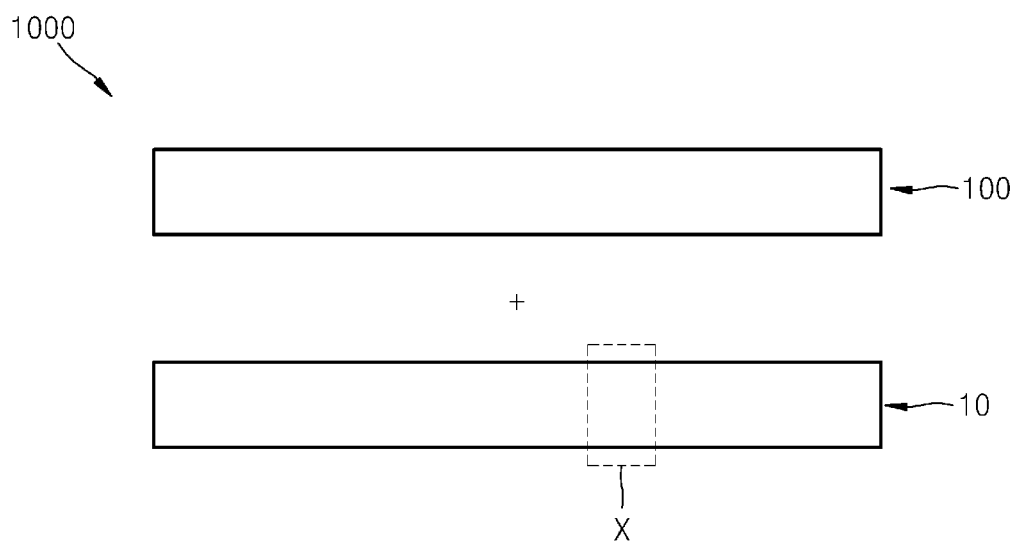
FIG. 8 is a schematic side view of a display apparatus according to an embodiment.
Figure 9:
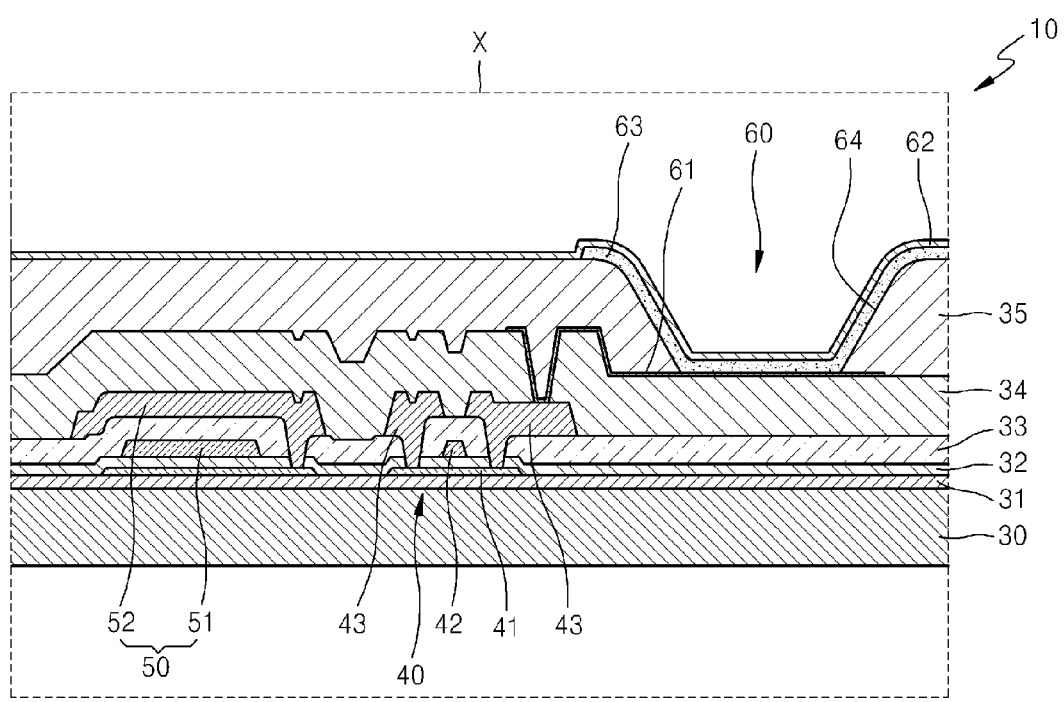
FIG. 9 is an enlarged view of part 'X' shown in FIG. 8.

FIG. 8 is a schematic side view of a display apparatus 1000 including the touch panel 100 of FIG. 1, according to an embodiment of the present disclosure. FIG. 9 is an enlarged view of part 'X' shown in FIG. 8.

Referring to FIG. 8, the display apparatus 1000 includes the touch panel 100 and a display panel 10.

The touch panel 100 of FIG. 1 has already been described above and thus a repeated description is omitted. Also, the display apparatus 1000 may include the touch panel 200 shown in FIG. 5.

In some embodiments, the touch panel 100 and the display panel 10 may be coupled to each other without using any additional member, and a member having various other characteristics may be inserted between the touch panel 100 and the display panel 10.

In some embodiments, although the touch panel 100 may be located above a display panel such as the display panel 10 in FIG. 8, the touch panel 100 may be located below the display panel 10. In some embodiments, the touch panel 100 may be located both above and below the display panel 10.

In some embodiments, the display panel 10 may be formed to have other shapes. For example, the display panel 10 may include an organic light-emitting device panel or a liquid crystal panel.

FIG. 9 shows the display panel 10 in detail. Embodiments of the display panel 10 including an organic light-emitting device panel will be described.

In some embodiments, the display panel 10 may be formed on a lower substrate 30. In some embodiments, the lower substrate 30 may be formed of glass, plastic, or metal material. In some embodiments, the display panel 10 and the touch panel 100 may be formed to have flexibility by forming the lower substrate 30 of a plastic material with flexibility so that the display apparatus 1000 may be deformed by a user.

In some embodiments, a buffer layer 31 may be formed on the lower substrate 30 to provide a planarization surface and to prevent moisture and foreign substances from penetrating into the lower substrate 30, wherein the buffer layer 31 includes an insulating material.

In some embodiments, a thin film transistor (TFT) 40, a capacitor 50, and an organic light emitting device 60 may be formed on the buffer layer 31. In some embodiments, the TFT 40 includes an active layer 41, a gate electrode 42, and source/drain electrodes 43. In some embodiments, the capacitor 50 includes a first capacitor electrode 51 and a second capacitor electrode 52.

In some embodiments, the organic light emitting device 60 includes a first electrode 61, a second electrode 62, and an intermediate layer 63.

In some embodiments, the active layer 41 may be located on the buffer layer 31 in a predetermined pattern. In some embodiments, the active layer 41 may include an inorganic semiconductor material, such as silicon, an organic semiconductor material, or an oxide semiconductor material, and may be formed by injecting a p- or n-type dopant.

In some embodiments, a gate insulating film 32 may be formed on the active layer 41. In some embodiments, the gate electrode 42 may be formed on the gate insulating film 32 to correspond to the active layer 41. In some embodiments, an insulating interlayer 33 may be formed to cover the gate electrode 42, and the source/drain electrodes 43 may be formed on the insulating interlayer 33 to contact predetermined areas of the active layer 41. In some embodiments, a passivation layer 34 may be formed to cover the source/drain electrodes 43, and an additional insulating layer may further be formed on the passivation layer 34 to planarize the TFT 40.

In some embodiments, the first electrode 61 may be formed on the passivation layer 34. In some embodiments, the first electrode 61 may be formed to be electrically connected to any one of the source/drain electrodes 43. In some embodiments, a pixel-defining layer 35 may be formed to cover the first electrode 61. In some embodiments, a predetermined opening 64 may be formed in the pixel-defining layer 35. In some embodiments, the intermediate layer 63, including an organic light-emitting layer may be formed in an area defined by the opening 64. In some embodiments, the second electrode 62 may be formed on the intermediate layer 63.

In some embodiments, an encapsulation layer (not shown) may be formed on the second electrode 62. In some embodiments, the encapsulation layer may be formed of various materials. In some embodiments, the encapsulation layer may include an organic material, an inorganic material, or a stack of an organic material and an inorganic material.

In some embodiments, the encapsulation layer may be formed of a glass material. In some embodiments, the substrate 101 of the touch panel 100 may be used as the encapsulation layer.

In some embodiments, the display apparatus 1000 includes the touch panel 100, and the touch panel 100 has improved electrical characteristics and flexibility, and thus user convenience is increased.

Conductive patterns may be easily formed in a touch panel prepared according the embodiments disclosed and described herein, a method of manufacturing the touch panel, and a display apparatus including the touch panel, and thus, electrical characteristics of the touch panel may be easily improved.

While the present embodiments have been particularly shown and described with reference to certain exemplary embodiments, it will be understood by those of ordinary skill in the art that various changes in form and details may be made therein without departing from the spirit and scope of the present embodiments as defined by the following claims.

What is claimed is:

1. A touch panel, comprising: a substrate; and a first conductive patterned portion that is formed on the substrate, wherein the first conductive patterned portion comprises:
   a first direction conductive portion that is formed on the substrate, the first direction conductive portion comprising a plurality of first body members, a first intermediate member formed between the first body members, and a first connection member which is electrically connected to the first body members;
   a second direction conductive portion that is formed on the substrate and is insulated from the first direction conductive portion, the second direction conductive portion comprising a plurality of second body members and a second connection member which is electrically connected to the second body members; and
   an overcoating layer comprising a plurality of nanowires containing silver (Ag),
   wherein at least one of the first body member and the second body member comprises the plurality of nanowires containing silver (Ag) and the overcoating layer is formed to cover at least one area of the first connection member or the second connection member,
   wherein if the first body member comprises the plurality of nanowires containing silver (Ag), a portion of the first body member comprising the plurality of nanowires together with a portion of the overcoating layer are formed to partially contact a top surface and a side surface of the first connection member, and
   wherein if the second body member comprises the plurality of nanowires containing silver (Ag), a portion of the second body member comprising the plurality of nanowires together with a portion of the overcoating layer are formed to partially contact a top surface and a side surface of the second connection member.

2. The touch panel of claim 1, wherein the first connection member and the second connection member comprise a metal material.

3. The touch panel of claim 1, wherein the first connection member comprises a first connecting element, which contacts the first body members, and a first extension member, which extends to be connected to the first connecting element and has a width smaller than that of the first connecting element.

4. The touch panel of claim 3, wherein the first body members are formed to partially cover a top surface of the first connecting element.

5. The touch panel of claim 3, wherein the first body members are formed to contact a top surface and a side surface of the first connecting element.

6. The touch panel of claim 1, wherein the second connection member comprises a second connecting element, which contacts the second body members, and a second extension member, which extends to be connected to the second connecting element and has a width smaller than that of the second connecting element.

7. The touch panel of claim 6, wherein the second body members are formed to partially cover of a top surface of the second connecting element.

8. The touch panel of claim 6, wherein the second body members are formed to contact a top surface and a side surface of the second connecting element.

9. The touch panel of claim 1, further comprising a first pad member, which contacts one end of the first connection member, and a second pad member that contacts one end of the second connection member.

10. The touch panel of claim 1, further comprising a second conductive patterned portion that is arranged to electrically connect the second body members, which are located adjacent to each other and spaced apart from each other.

11. The touch panel of claim 10, further comprising an insulating layer that is arranged to cover at least the second body members, the first body members, and the first intermediate member, the insulating layer comprising contact holes corresponding to top surfaces of the second body members,
   wherein the second conductive patterned portion contacts the second body members that are located adjacent to each other via the contact holes and spaced apart from each other.

12. The touch panel of claim 10, further comprising an insulating layer that covers a predetermined area of the first intermediate member, where the insulating layer is formed below the second conductive patterned portion, and the insulating layer is patterned to insulate the first intermediate member and the second conductive patterned portion from each other.

13. The touch panel of claim 1, wherein the first direction conductive portion and the second direction conductive portion are located on the same surface of the substrate.

14. The touch panel of claim 1, wherein the first direction conductive portion and the second direction conductive portion are located on different surfaces of the substrate.

15. The display apparatus of claim 1, wherein the first body member and the second body member both comprise a plurality of nanowires containing silver (Ag).

16. A display apparatus, comprising:
   a touch panel; and
   a display panel located at one side of the touch panel,
   wherein the touch panel comprises a substrate and a first conductive patterned portion that is formed on the substrate,
   wherein the first conductive patterned portion comprises:
   a first direction conductive portion that is formed on the substrate, wherein the first direction conductive portion comprises a plurality of first body members, a first intermediate member formed between the first body members, and a first connection member which is electrically connected to the first body members; and
   a second direction conductive portion that is formed on the substrate and is insulated from the first direction conductive portion, wherein the second direction conductive portion comprises a plurality of second body members and a second connection member which is electrically connected to the second body members;
   an overcoating layer comprising a plurality of nanowires containing silver (Ag),
   wherein at least one of the first body member and the second body member comprises the plurality of nanowires containing silver (Ag) and the overcoating layer is formed to cover at least one area of the first connection member or the second connection member,
   wherein if the first body member comprises the plurality of nanowires containing silver (Ag), a portion of the first body member comprising the plurality of nanowires together with a portion of the overcoating layer are formed to partially contact a top surface and a side surface of the first connection member, and wherein if the second body member comprises the plurality of nanowires containing silver (Ag), a portion of the second body member comprising the plurality of nanowires together with a portion of the overcoating layer are formed to partially contact a top surface and a side surface of the second connection member.

17. The display apparatus of claim 16, wherein the display panel comprises an organic light-emitting device panel or a liquid crystal panel.

18. The display apparatus of claim 16, wherein the first body member and the second body member both comprise a plurality of nanowires containing silver (Ag).

* * * * *